Dec. 16, 1958 M. F. MOORE 2,864,590
AIR CONDITIONING APPARATUS FOR AUTOMOTIVE VEHICLE
Filed Dec. 7, 1956 3 Sheets-Sheet 1

INVENTOR.
MEADE F. MOORE
BY
Carl J. Barbee
ATTORNEY

INVENTOR.
MEADE F. MOORE
BY
Carl J. Barbee
ATTORNEY

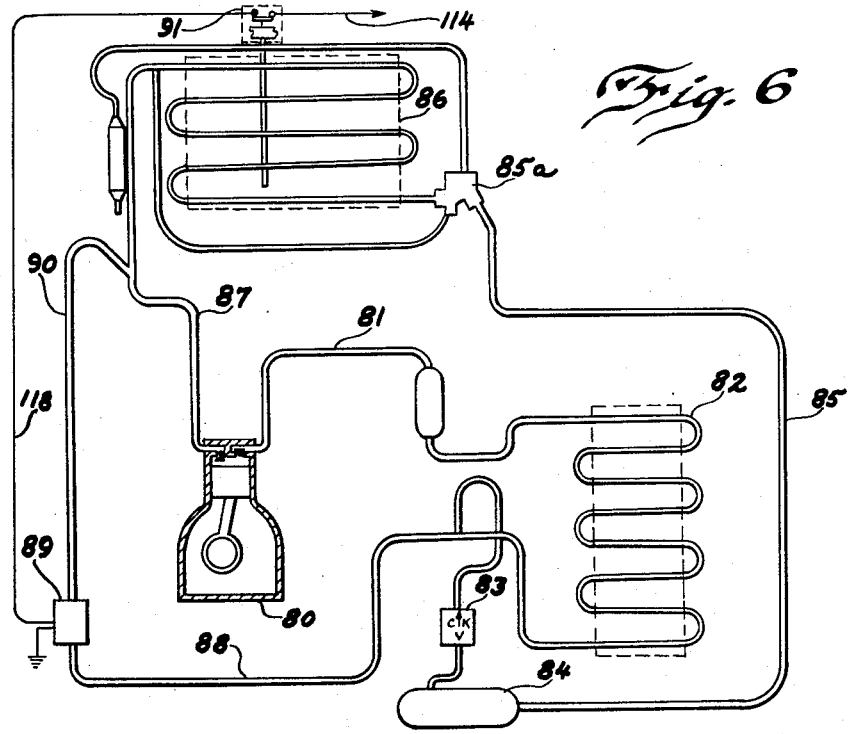
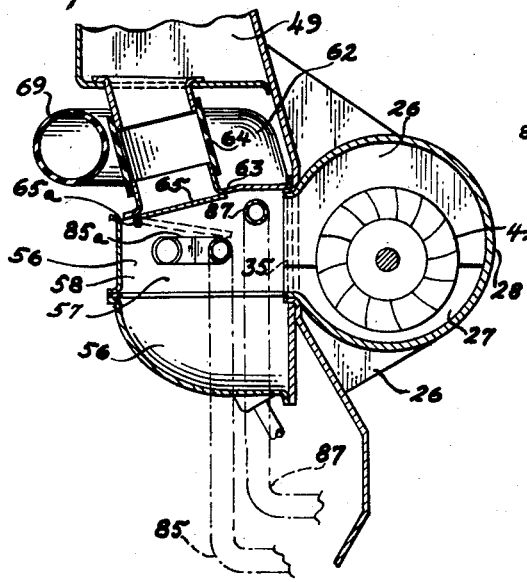
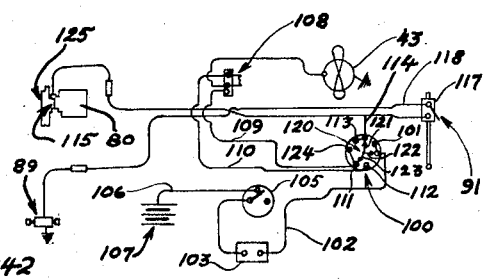
INVENTOR.
MEADE F. MOORE
BY
Carl J. Barbee
ATTORNEY United States Patent Office 2,864,590
Patented Dec. 16, 1958

2,864,590

AIR CONDITIONING APPARATUS FOR AUTOMOTIVE VEHICLE

Meade F. Moore, Birmingham, Mich., assignor to American Motors Corporation, Kenosha, Wis., a corporation of Maryland Application December 7, 1956, Serial No. 627,069

6 Claims. (Cl. 257—7)

The invention relates to an air conditioning system for an automotive vehicle wherein heated air is provided for the passenger compartment when the temperature outside of the vehicle is below normal and refrigerated air is provided for the passenger compartment when the temperature outside of the vehicle is above normal.

In general, the invention is directed to an improved air conditioning system of the type in which the heat radiating core and the heat absorbing core are arranged at the instrument panel of the vehicle.

A specific object of the invention is to provide an improved air routing and air control system.

A further object is to provide a "unified" heating and cooling system at the vehicle instrument panel which is largely integrated with the vehicle proper.

A further object is to provide in a system of the type hereinbefore described an arrangement for pressurizing the incoming atmospheric air before discharging same into the passenger compartment.

A further object is to provide in a system of the type described a more even distribution of air with generally centralized discharge ducts.

Other objects and advantages of the invention will be apparent from the ensuing specification and appended drawings in which:

Figure 5 is a sectional view taken on the line 5—5 of Figure 1 and showing a portion of the refrigeration system schematically;

Figure 6 is a schematic view of the refrigeration system;

Figure 7 is a schematic view and wiring diagram employed in the system; and

Figure 8:
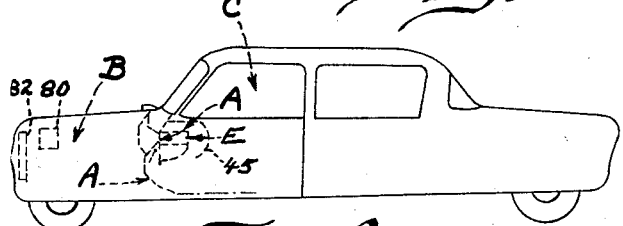
Figure 8 is a side elevational view of an automotive vehicle showing in dotted lines portions of the air conditioning system.
Figures 3, 4:
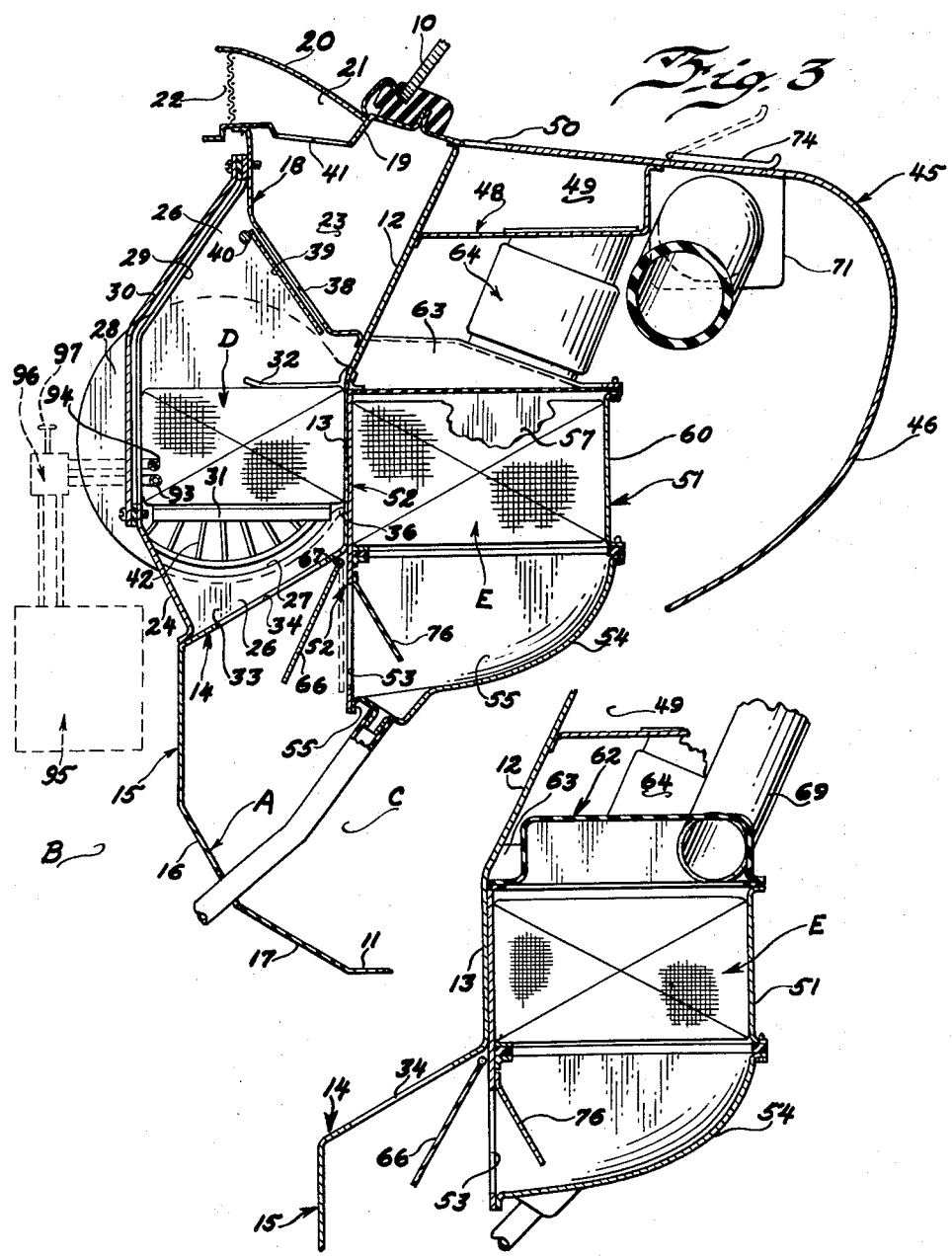
Figure 3 is a sectional view taken on the irregular line 3—3 of Figure 1 and including a schematic showing of a portion of the water circulatory system utilized in supplying the heat radiating core.
Figure 4 is a sectional view taken on the line 4—4 of Figure 1 but eliminating that portion of the air conditioning system which is located on the engine compartment side of the instrument panel.

Referring to Figure 8 there is shown generally a passenger type automobile having a "dash" panel A separating the engine compartment B from the passenger compartment C. The heat radiating core D is mounted on the engine compartment side of the instrument panel and the heat absorbing core E is mounted on the passenger compartment side thereof. It should be pointed out here that in Figure 3 these cores are shown schematically and a true representation would show the cores in section comprising a series of tubes to which suitable heat transfer fins are secured.

The operation of the heat radiating core includes a water circulation system which will be explained hereinafter and which functions to supply heated water to the core. In the operation of the heat absorbing core (which will be referred to hereinafter as the "cooling" core), a refrigeration system is employed wherein a refrigerant is passed through the core—the refrigeration system being explained more fully hereinafter.

The dash panel A extends throughout the width of the vehicle from one side to the opposite side thereof and also extends from the lower edge of the windshield 10 down to the floor 11 and may include in its upper region an angularly inclined wall portion 12, the generally vertically and downwardly extending wall portion 13, the angularly inclined wall portion 14, the generally vertically and downwardly depending wall portion 15 and the angularly forwardly inclined wall portions 16 and 17 defining an area for foot resting purposes.

Secured to the upper portion of the dash panel as by means of welding is a forwardly projecting panel 18 which lends support to the roof panel 19, these two panels preferably extending across the width of the vehicle. Above the roof panel is the cowl 20 which in conjunction with the roof panel forms the initial reception chamber 21 into which the atmospheric air enters through the opening 22.

Figure 2:
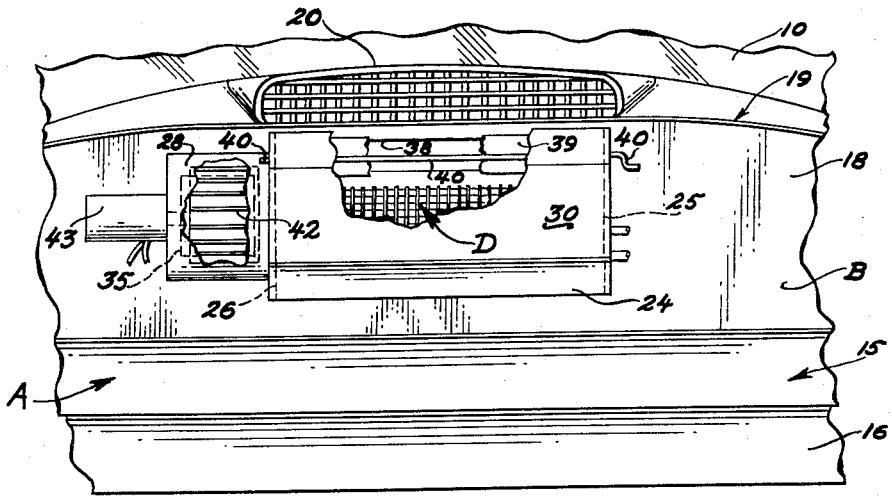
Figure 2 is a front elevational view of that portion of the air conditioning system located on the engine compartment side of the dash panel with parts being broken in section.

Between the upper portion 12 of the instrument panel and the forward panel 18, an air reception chamber 23 is formed, rain water or other foreign materials which enter the opening 22 being disposed of at either end of this compartment, as by means of suitable drain outlets (not shown). A stamping 24 is secured along its lower margin to the engine compartment side of the dash panel and along its upper margin to the forward face of the panel 18 and forms in conjunction with the panel 18 and the dash panel, a closed housing within which the heat radiating core D is mounted. The housing is provided with appropriate end walls 25 and 26 (see Figure 2), the end wall 26 having a large opening 27 (see Figure 3) therein for establishing communication between the interior of the housing and the interior of the blower housing 28.

The stamping 24 has a large opening 29 (extending throughout most of the height thereof) for obtaining access to the heat radiating core for installation and future servicing of same. A suitable cover 30 is removably secured to the stamping 24 and closes off the opening 29. The heat radiating core may be supported on suitable brackets 31 (only one of which is shown) secured within the housing at the opposite end walls thereof. Resilient spring clips 32 may be employed for holding the core against the brackets. The core extends throughout the length of the housing from end wall 25 to end wall 26 and consequently, the atmospheric air entering the housing must pass through the core before entering chamber 33 formed by the housing beneath the core. The air then travels on through the opening 34 formed in the dash panel or into the interior of the blower housing from whence it travels through the opening 35 (shown in dotted lines in Figure 2 and also shown in Figure 5) and thence through the remainder of the air conditioning system as will be explained more fully hereinafter.

The blower housing 28 has an opening in one wall thereof, as shown in Figure 5, which registers with the instrument panel opening 35, the blower housing preferably having an inwardly directed flange 36 circumscribing its opening and projecting through the instrument panel opening 35 and being secured thereto.

The panel 18 has an opening 38 therein and a damper 39 is mounted on a suitable transverse rod 40 for controlling the passage of air through the opening 38. The roof panel 19 has an opening 41 for passage of air into the compartment 23. The blower 42 is activated by a suitable motor 43 as will be explained more fully hereinafter.

On the passenger compartment side of the instrument panel, a stamping 45, functioning in the manner of an "instrument" panel extends across the width of the vehicle and projects into the interior of the passenger compartment, having a downwardly directed portion 46 which serves as a shroud for concealing most of the components of the air conditioning system from the eyes of the vehicle passengers. Directly beneath the roof portion of the instrument panel, a stamping 48 is secured providing a compartment identified generally by the numeral 49 for directing air for windshield defrosting purposes. Suitable openings 50 permit escape of air from the compartment onto the windshield.

Figure 1:
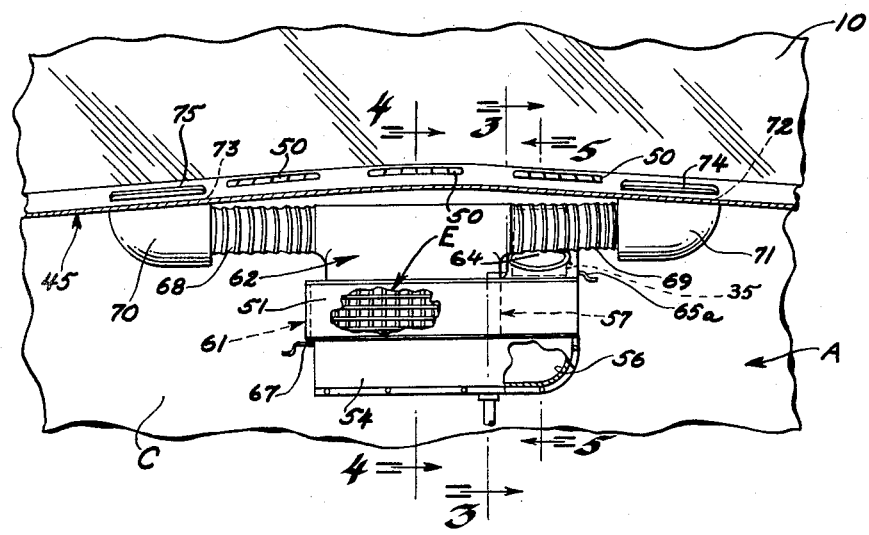
Figure 1 is a front elevational view of that portion of the air conditioning system located within the passenger compartment, certain parts being broken in section.

The heat absorbing core E is mounted on the passenger compartment side of the instrument panel approximately directly opposite from the heat radiating core and is housed in a suitable housing identified generally by the numeral 51. The housing may include a rear panel 52 which depends downwardly beyond the underside of the core and has an opening 53 therein, the functions of which will be explained hereinafter. A cover 54 has its lower margin 55 secured to the lower margin of the panel 52 and in conjunction with the underside of the cooling core provides a compartment or duct 55 which is in open communication with the end compartment 56 beyond the end of the core (indicated in dotted lines at 57 in Figure 1)—the end compartment being in open communication with the interior of the blower housing through the opening 35. The end of the cooling core may be closed off as by means of a panel 58 so that air entering the compartment 56 from the blower housing is directed beneath the cooling core into compartment 55.

The remaining components of the housing surrounding the cooling core include the front panel 60, the end panel 61 (shown in dotted lines in Figure 1) and the overhead cover 62 which closes off the upper side of the core. Immediately beyond the end wall of the cover is a stamping 63 which closes off the upper end of the compartment 56 beyond the end of the cooling core. A conduit indicated generally by the numeral 64 establishes communication between the interior of the compartments 56 and 49. A damper 65 mounted on a suitable actuating rod 65a (see Figure 5) controls the passage of air from the compartment 56 to the compartment 49. Thus, the air that is discharged from the blower housing through the opening 35 enters the compartment 56 and a major portion thereof travels on into compartment 55 (which is in effect a continuation of compartment 56 beneath the level of the underside of the cooling core) and the remaining portion of such air, if damper 65 is open, travels through duct 64 into the compartment 49 for windshield defrosting purposes. A damper 66 is supported on a transverse operating rod 67 (see Figure 1) and may be utilized to open the opening 53 while closing opening 34 and vice versa as will be explained more fully hereinafter.

With the damper 66 closing off opening 53 the air discharged from the blower housing into compartment 55 travels upwardly through the cooling core into the interior of the cover 62 and thence out through the ducts 68 and 69 emanating from the opposite ends of the cover 62. The air then travels into the end housings 70 and 71 from whence it is discharged through appropriate openings 72 and 73 (shown in dotted lines in Figure 1) which are formed in the roof portion of the instrument panel 45. Suitable covers 74 and 75 control the quantity of air discharged through the respective openings 72 and 73. A baffle 76 may be employed adjacent opening 53 for assisting air travel through duct 55 and up through the cooling core.

A brief description of the general operation of the refrigeration system and of the hot water circulation system as well as a brief description of the electrical system involved in the operation of the air conditioning system will be set forth hereinafter.

*Operation*

It will be understood that both the heating and the cooling features of the air conditioning system may be utilized either while the vehicle is standing still or while it is in motion.

Under a condition in which the vehicle is moving forwardly, the operation of the system may be as follows. The forward movement of the vehicle causes the atmospheric air to enter opening 22 under pressure—this air being referred to hereinafter as "ram" air. The damper 39, when closed, substantially negates the operation of the system and such damper would probably be closed on a mild day when neither heating nor cooling of the passenger compartment is desired and the closing of the damper would prevent a draft from entering the passenger compartment. With the damper open and assuming that the weather conditions are such that heated air entering the passenger compartment is desired, then such condition can be obtained either with or without the operation of the blower 42. If the blower is not in operation, then the "ram" air enters opening 22 and then travels through openings 41 and 38 then downwardly through the heat radiating core D (same being activated) into compartment 33 and on through opening 34 into the passenger compartment, the damper 66 being swung over so as to close off opening 53. A small portion of this "ram" air will be diverted into the blower housing and pass through the opening 35 into the compartment 56 and if damper 65 is opened, some of this air will be directed through duct 64 and openings 50 onto the windshield. If desired, the blower can be operated even though opening 34 is open and then a substantial portion of heated air would travel through opening 35 and would be directed up to the windshield through the duct 64 (damper 65 being opened).

Under certain conditions it may be desirable to use the forced air system exclusively when heating the passenger compartment and in such a case, the damper 66 would be swung over so as to close off opening 34 and the blower would be put into operation thereby causing the atmospheric ram air, after traveling through the heater core D, to be drawn into the blower housing 28 and discharged through opening 35 into the compartment 56 from whence it travels beneath the cooling core E through duct 55 and into the passenger compartment through opening 53. If damper 65 is open, a large portion of the heated air will be directed onto the windshield for defrosting purposes. Use of the forced air system for heating the interior of the vehicle would be desirable when the vehicle is standing still or moving slowly in traffic.

When it is desired to cool the interior of the passenger compartment, then the damper 66 is swung over to close off opening 53 and the blower is put in operation. The heat absorbing core E is activated (a brief explanation of the refrigeration system to be explained hereinafter) and the air outlet doors 74 and 75 are lifted to permit discharge of the cooled air through the outlet openings 72 and 73 into the passenger compartment. The damper 39 is open and ram air (if the vehicle is moving) travels through opening 38, thence through core D (deactivated), then into the blower housing, from whence it is forced by the blower through opening 35 into compartment 56 and on into duct 55, then up through the heat absorbing core into the interior of the cover 62, thence through ducts 68 and 69 and out through the discharge openings 72 and 73. In addition to the ram air entering opening 22, a quantity of air from within the passenger compartment is drawn by the blower through opening 34 where it is mixed with the atmospheric ram air before entering the blower housing 28. Thus, when operating the cooling system, opening 34 becomes an inlet opening for effecting recirculation of the passenger compartment air. If the vehicle is standing still during operation of the cooling system, then there will be a larger portion of recirculated passenger compartment air mixing with the incoming atmospheric air under the inducement of the blower. It should also be pointed out here that the damper 39 can be mounted so that in one position of rotation of its supporting rod a partial opening of the damper is effected to reduce the quantity of flow of atmospheric air into the system and thereby increase the quantity of flow of recirculated passenger compartment air through the system.

The refrigeration system

Referring to Figure 6, a schematic view of a suitable refrigeration system is shown and includes a compressor 80 which pumps a refrigerant through the high pressure conduit 81, condensor 82, check valve 83, receiver 84, conduit 85, expansion valve 85a, then through the evaporator 86 and thence back through low pressure conduit 87 to the compressor. The evaporator has been referred to herein as the heat absorbing core. A by-pass cycle is included in the refrigeration system for by-passing the refrigerant and drawing same through the conduit 88, solenoid valve 89, conduit 90 and conduit 87 back to the compressor. The operation of the by-pass cycle is effected by actuating the solenoid by-pass valve in response to temperature condition within the passenger compartment, that is, when the temperature within the passenger compartment has been lowered to the desired temperature, then a thermostatically responsive switch 91 opens the circuit to the solenoid valve thereby bringing the by-pass cycle into operation.

Heating system

The heating of the core D, when using the heating system, is effected by means of a conventional arrangement wherein heated water from the engine block is directed through a suitable inlet conduit 93, then through the core D and is returned to the engine block through a suitable outlet conduit 94. The engine block is indicated schematically in Figure 3 by the numeral 95 and a thermostatically responsive control valve is also indicated schematically by the numeral 96. When the valve is fully opened, a full flow of water travels through core D and a partial opening of the valve permits only a limited quantity of water to travel through the core. The setting of the valve may be accomplished by means of a suitable control 97 to regulate the resultant temperature within the passenger compartment.

Electrical system

Referring to Figure 7, there is shown a preferred form of electrical system utilized in conjunction with the air conditioning system. The main control switch identified generally by the numeral 100 is of a compound type and includes the double terminal 101 which has lead wire 102 leading through a circuit breaker 103 to the terminal 104 of the ignition switch, the other terminal 105 of said latter switch having a lead wire 106 running to the battery 107. The blower motor 43 is preferably provided with two speeds which may be termed low and high and the two speed feature is accomplished with a resistor assembly 108 which has the lead wires 109 and 110 running to the terminals 111 and 112 located on the compound switch 100. The double terminal 113 has a lead wire 114 running to the magnetically controlled clutch 115 of the compressor. Switch 91 has a terminal 117 and a lead wire 118 running therefrom to the solenoid valve 89 which controls the operation of the by-pass cycle in the refrigeration system. The switch 91 is responsive to the temperature condition within the passenger compartment as was previously explained herein.

When it is desired to utilize the cooling feature of the air conditioning system, the switch rotor 120 is rotated until terminal arms 121, 122 and 123 are engaged with the terminals 101, 113 and either 111 or 112 (depending upon whether high speed or low speed operation of the blower is desired). When it is desired to utilize the heating feature of the air conditioning system, then the switch rotor is rotated until the terminal arm 121 engages terminal 101 and terminal arm 123 engages terminal 124 (which is connected to terminal 111). Thus while using the heating system, the blower motor can be energized while keeping the circuit to the compressor clutch open. It will be understood that the pulley 125 is operated whenever the engine is running, however, the compressor is not driven unless the clutch is engaged.

The actuating rods 40, 65a and 67 for the respective dampers 39, 65 and 66 are shown in a manner requiring manual grasping of the rods for rotating same to open or close the dampers as desired, however, in practice each of the damper control rods would be associated with a Bowden wire control having a control knob situated on the instrument panel in a location readily accessible to the driver of the vehicle. The Bowden wire controls are not disclosed since they do not form the subject matter of the invention. In practice, for example, the Bowden wire control for the damper 66 is incorporated in the operation of the compound switch assembly 100, however, since this structure forms no part of the invention, the operation of the switch is shown to be separate and apart from the operation of the damper.

What is claimed is:

1. In an air conditioning system for an automotive vehicle having an engine compartment and a passenger compartment, an air conditioning apparatus comprising: a primary panel separating the engine compartment from the passenger compartment; a heat radiating device mounted at the panel on the engine compartment side thereof; means for activating the heating device for heating the surrounding air; a housing structure surrounding the heat radiating device; said panel having a first opening therein beneath the heat radiating device for establishing communication between the interior of the housing and the passenger compartment; said housing having an opening therein above the heat radiating device for establishing communication between the interior of the housing and atmosphere; a cooling device mounted at the panel on the passenger compartment side thereof; means for activating the cooling device for cooling the surrounding air; a second housing structure surrounding the cooling device and having an opening therein for establishing communication between the interior of the second housing structure and the passenger compartment; a blower mounted within the first housing structure at one end thereof beyond the end of the heating device; said primary panel having a second opening therein for establishing communication between the first housing structure and the second housing structure; means for selectively activating the blower; said second housing structure having an air reception chamber exposed to the second panel opening and located at one end of and beyond the cooling device; an air transfer duct positioned beneath the cooling device and in communication with the air reception chamber; said latter duct having an opening for establishing communication between the interior thereof and the interior of the passenger compartment; a second air transfer duct positioned above the cooling device and having an opening for establishing communication between the interior of said duct and the interior of the passenger compartment; means for selectively closing off said last opening; means for selectively closing off the opening in the first mentioned air transfer duct; means for selectively closing off the first panel opening; a first air route including the first housing opening, the heating device, the first panel opening and the passenger compartment, when the means for closing off the first panel opening is opened; a second air route including the first housing opening, the heating device, the blower, the second panel opening, the air reception chamber and the first air transfer duct, when the means for closing said duct is open; a third air route including the first housing opening, the heating device, the blower, the second panel opening, the air reception chamber, the second air transfer duct, the opening in said second transfer duct and the passenger compartment, when the means for closing off the opening in the second aid transfer duct, is open.

2. An air conditioning system for an automotive vehicle as set forth in claim 1 wherein the means for closing off the first panel opening and the opening in the second air transfer duct consists of a damper swingably mounted so as to close off one of said openings while opening the other and vice versa.

3. In an air conditioning system for an automotive vehicle having an engine compartment and a passenger compartment, an air conditioning apparatus comprising: a primary panel separating the engine compartment from the passenger compartment; a heat radiating device mounted at the panel on the engine compartment side thereof; means for activating the heating device for heating the surrounding air; a housing structure surrounding the heat radiating device; said panel having a first opening therein beneath the heat radiating device for establishing communication between the interior of the housing and the passenger compartment; said housing having an opening therein above the heat radiating device for establishing communication between the interior of the housing and atmosphere; a cooling device mounted at the panel on the passenger compartment side thereof; means for activating the cooling device for cooling the surrounding air; a second housing structure surrounding the cooling device and having an opening therein for establishing communication between the interior of the second housing structure and the passenger compartment; a blower mounted in the first housing structure at one end thereof beyond the end of the heating device; said primary panel having a second opening therein for establishing communication between the interior of the first housing structure and the interior of the second housing structure; an air reception compartment located at one end of the second housing structure, beyond the end of the cooling device; a first air transfer duct for establishing communication between the air reception compartment and the interior of the passenger compartment; means for closing off said first air transfer duct; a second air transfer duct within the second housing structure and positioned beneath the cooling device and being in communication with the air reception compartment; said second air transfer duct having an opening for establishing communication between the interior of the second air transfer duct and the passenger compartment and means for selectively closing off the opening in the second air transfer duct.

4. An air conditioning system for an automotive vehicle as set forth in claim 3 and including means for closing off the first primary panel opening, whereby when such means are in closed position, the air travels through the blower and into the air reception compartment and on through the first air transfer duct if same is open and on through the second air transfer duct if same is open.

5. In an air conditioning system for an automotive vehicle having an engine compartment and a passenger compartment, an air conditioning apparatus comprising: a primary panel separating the engine compartment from the passenger compartment; a heat radiating device having an end wall exposed adjacent the panel on the engine compartment side thereof; means for activating the heating device for heating the surrounding air; a first housing structure surrounding the heat radiating device, the primary panel serving as one wall of the first housing structure; said panel having a first opening therein beneath the heat radiating device for establishing communication between the interior of the housing and the passenger compartment; said housing having an opening therein above the heat radiating device for establishing communication between the interior of the housing and atmosphere; a cooling device having an end wall exposed adjacent the panel on the passenger compartment side thereof so as to be in back-to-back position relative to the heat radiating device but separated from such device by the panel; means for activating the cooling device for cooling the surrounding air; a second housing structure surrounding the cooling device and having an opening therein for establishing communication between the interior of the second housing structure and the passenger compartment; said primary panel having a second opening therein for establishing communication between the first housing structure and the second housing structure, the second panel opening being located beyond the ends of the heat radiating device and the cooling device.

6. In an air conditioning system for an automotive vehicle having an engine compartment and a passenger compartment, an air conditioning apparatus comprising: a primary panel separating the engine compartment from the passenger compartment; a heat radiating device mounted at the panel on the engine compartment side thereof; means for activating the heating device for heating the surrounding air; a housing structure surrounding the heat radiating device; said panel having a first opening therein beneath the heat radiating device for establishing communication between the interior of the housing and the passenger compartment; said housing having an opening therein above the heat radiating device for establishing communication between the interior of the housing and atmosphere; a cooling device mounted at the panel on the passenger compartment side thereof; means for activating the cooling device for cooling the surrounding air; a second housing structure surrounding the cooling device and having an opening therein for establishing communication between the interior of the second housing structure and the passenger compartment, each of said housing structures extending beyond the ends of the heat radiating device and the cooling device respectively, said primary panel having a second opening therein for establishing communication between the first housing structure and the second housing structure beyond the ends of the heat radiating device and cooling device.

References Cited in the file of this patent

UNITED STATES PATENTS

| | | |
|---|---|---|
| 2,789,794 | Moore et al. | Apr. 23, 1957 |
| 2,796,820 | Moore et al. | June 25, 1957 |